United States Patent [19]
Long et al.

[11] 3,819,054
[45] June 25, 1974

[54] SEWAGE TREATMENT SYSTEM

[76] Inventors: Hubert G. Long; Veron E. Long, both of P.O. Box 180X, Rt. 1, Festus, Mo. 63010

[22] Filed: Sept. 8, 1971

[21] Appl. No.: 178,635

[52] U.S. Cl.................. 210/195, 210/199, 210/221
[51] Int. Cl............................................. C02c 1/02
[58] Field of Search........................... 210/3–9, 13, 210/14, 15, 195, 197, 199, 221, 242

[56] References Cited
UNITED STATES PATENTS

| | | | |
|---|---|---|---|
| 2,477,459 | 7/1949 | Kelly | 210/221 |
| 2,901,114 | 8/1959 | Smith et al | 210/15 X |
| 2,989,185 | 6/1961 | Lombardi | 210/242 |
| 3,182,801 | 5/1965 | Griffith | 210/15 X |
| 3,374,893 | 3/1968 | Stretton | 210/242 X |
| 3,534,857 | 10/1970 | Berk | 210/14 X |
| 3,627,135 | 12/1971 | Goodman | 210/221 X |

Primary Examiner—Samih N. Zaharna
Assistant Examiner—Peter A. Hruskoci

[57] ABSTRACT

A sewage treatment system especially adapted to be a conversion unit for existing septic tanks, comprising an inner tank to receive raw sewage, the inner tank being within the septic tank and spaced from the walls thereof with its upper surface open above the liquid line; with an air diffuser system delivering compressed air within the inner tank just above a slot along its bottom to aerate and circulate the influent sewage delivered into the inner tank, and also to draw activated solid portions settling from the clarifier zone in the outer tank toward the sludge zone at the bottom thereof, through the slot in the inner tank into the aeration zone therein for further aeration treatment, with a final V-notched weir discharge means attached to the outer wall of the inner tank, with or without a chlorinator, and finally with a float skimmer means that insures the return of floating solids from the clarifier zone to the interior of the inner tank for retreatment.

9 Claims, 9 Drawing Figures

PATENTED JUN 25 1974 3,819,054

INVENTORS:
HUBERT G. LONG,
VERNON E. LONG,
By Rogers, Ezell, Eilers & Robbins
ATTORNEYS

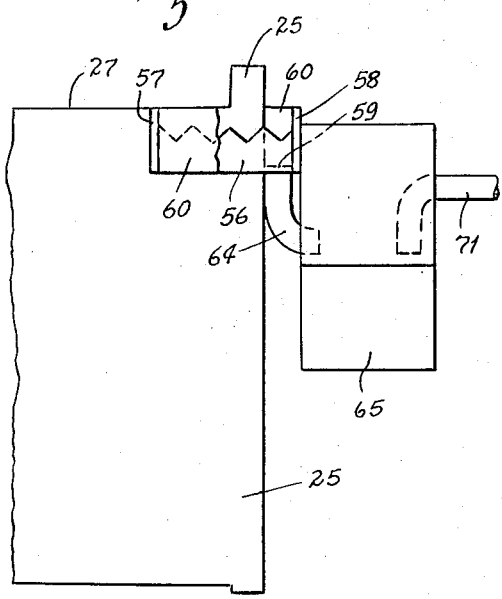
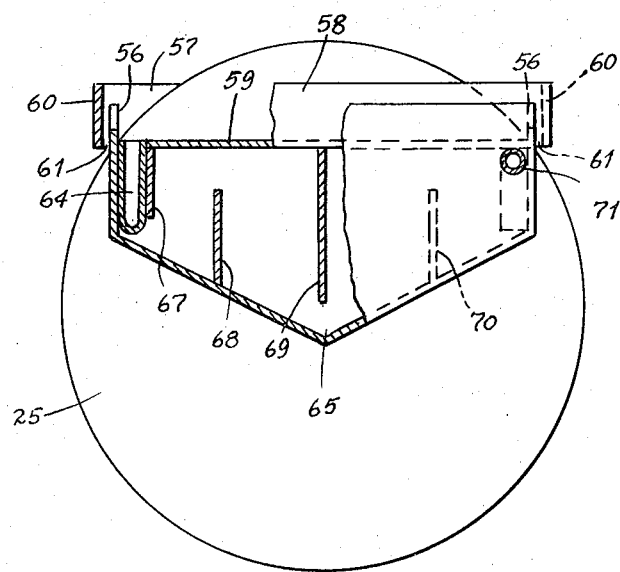
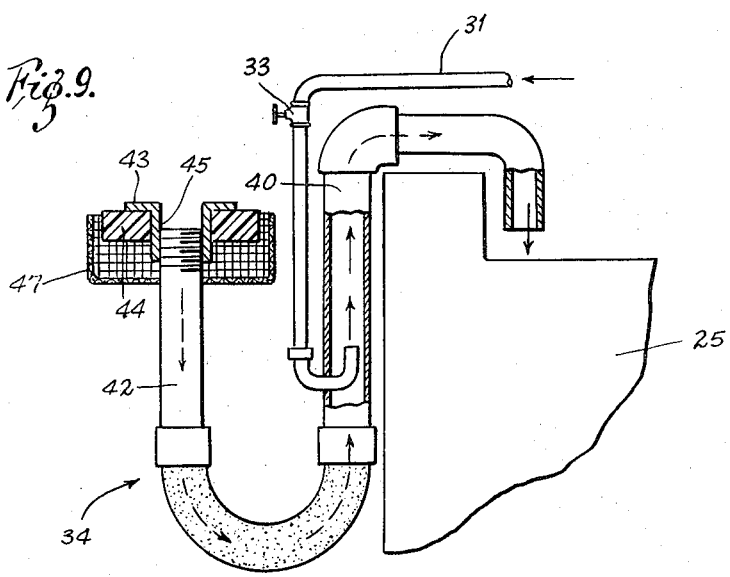

SEWAGE TREATMENT SYSTEM

BACKGROUND OF THE INVENTION

Heretofore there have been sewage treating systems in which an inner tank and an outer tank have been used. It is believed that none had the inner tank open at the bottom and top and with aeration means delivering compressed air at the bottom thereof just over the bottom slot to cause two effects, namely, aeration of incoming sewage delivered into the inner tank, and to cause re-drawing of solids settling from the clarifier zone outside the inner tank back into the aeration zone for further treatment.

Also, the present system can be used as a conversion system for existing septic tanks by manufacturing the inner tank in such wise as to fit into an existing septic tank and function as described. This can convert an anaerobic septic tank into an aerobic system at a relatively low cost.

Another feature of the present invention is the floating skimmer intake designed so that the intake remains a fixed distance below the level of liquid within the tank. Sometimes, if a tank is unused for a period of time, evaporation may lower the liquid level. A fixed skimmer is then left with its intake above the liquid level and hence above solids floating thereon. Accordingly, such solids may not be carried back to the aeration zone and on a subsequent inflow of liquid, clog the skimmer.

Another feature of the present invention is a notched overflow weir arrangement. This causes the effluent to flow out with a minimum depth over the bottom point of the weirs and yet preserves the weir action that aids in preventing outflow of coarse solids. This result is aided by scum baffles located outside the weir walls and are arranged so that there are only narrow inflow slots to the weirs, which also inhibits the flow of large solids thereto.

All of these features, the skimmer, the overflow weir either of the side overflow or end overflow type, and the chlorinator, as well as the air piping, can be fabricated above ground and sub-assembled above ground to be installed into an existing septic tank substantially, if not wholly, as a single unit.

In the drawings:

FIG. 7 is a side elevation also partly broken away of a side overflow weir and chlorinator;

FIG. 8 is a view of the side overflow weir with chlorinator partly broken away across the end of the weir and also across part of the chlorinator; and FIG. 9 is an elevation of a preferred form of skimmer used with this system.

Figure 3:
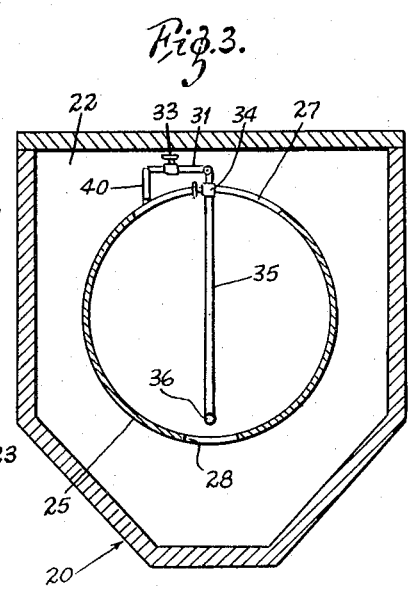
FIG. 3 is a transverse section on the line 3—3 of FIG. 2, taken about the middle thereof and looking to the left.
Figure 4:
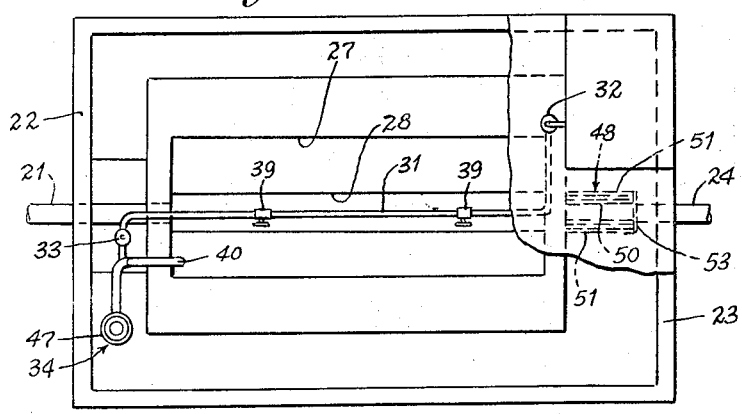
FIG. 4 is a top view of the assembly of FIG. 2.

DESCRIPTION OF THE PREFERRED EMBODIMENT:

The system includes a primary tank 20. This may be a conventional septic tank with removable cover, as one of the advantages of the present invention is that it can be built as a conversion unit for an existing septic tank. The primary tank 20 is illustrated particularly in FIG. 3 as having inwardly sloping lower side walls giving a reduced horizontal bottom wall, this being a characteristic shape of septic tanks to provide for sludge accumulation. The material usually is concrete casting. The cover may be of suitable material, and where not underground, may be a grill.

An influent pipe 21 leads through one end wall 22 at the upper part of the outer tank 20. An effluent pipe 24 leads through at a slightly lower point in the opposite end wall 23.

An inner tank 25 is mounted inside the main or primary tank 20. It is illustrated in the form of a metal cylinder with end walls closed. It may be of other shapes, but should have curved corners to provide ready circulation as will appear. It is also desirable for it to have a large exposed upper surface to enhance aeration at the surface. The influent pipe 21 is connected into the upper part of one end wall of the inner tank. The size of the tank 25 is such that it is contained within the outer tank 20 with free space all around. It is provided with supports (not shown) appropriate to fit into the primary tank. Being open bottom and top, it does not have to support its liquid contents against gravity.

The inner tank 25 has a large generally rectangular opening 27 at its upper side, that is located wholly above the water line of the system. Likewise, there is a narrower elongated slot 28 in the bottom part of the inner tank 25. The opening 27 and slot 28 extend substantially from end to end of the inner tank and have the shapes preferably as illustrated.

This being an aerobic system, it is supplied with a source of air under pressure, here indicated as a compressor 30 illustrated as mounted on the top of the outer tank 20 at one end. It may be mounted separately and above the ground surface for convenience of servicing. A pipe 31 leads from the compressor 30 through a union 32 coaxially with the inner tank 25 midway of the top thereof and over the opening 27. Normally the compressor may be operated intermittently by a timer, as is known in the art, or it may be operated continuously.

The far end of the pipe 31 has manually adjustable valve 33 controlling a connection into a skimmer 34, preferably one of the type to be described hereafter. The pipe 31 also leads to two vertical pipes 35 that extend down substantially to the bottom of the inner tank 25, and there branch into horizontal diffuser pipes 36 that have multiple air outlets along their entire lengths. The diffuser pipes 36 extend lengthwise of the inner tank 25 above the slot 28, preferably medially thereof. The purpose of this arrangement is to provide diffusers along substantially the entire bottom of the inner tank over the bottom slot 28 thereof, so that air can be delivered upwardly therefrom into a major part of the inner tank 25. Valves 39 may be provided for individual control and regulation of the air to the diffusers 36.

The preferred form of skimmer is illustrated in FIG. 9. It has a fixed outlet pipe 40 attached to the end of the tank 25 and extending across the end wall to discharge through the slot 27 in the top of the tank 25. Outside the tank 25 the fixed pipe 40 extends vertically below the water level, and is connected by a flexible tube 41 to a vertical pipe 42 that preferably is of light weight material. The pipe 42 has a flanged upper end 43 threaded onto the upper end of the pipe 42, and under the flange a float 44 is located. The flange and float are notched at 45 in a manner to dispose the bottom of the notches just below the water level to permit solid matter at the surface of the liquid to be drawn through the notches 45 into the pipe 42. The air pipe 31 discharges air upwardly into the vertical pipe 40, causing flow through the pipe, discharging the solid material back into the aeration chamber in the inner tank 25. The float arrangement constitutes means to dispose overflow walls at a constant distance just below the liquid level in the tank 20, so that a change in the water level that may be occasioned by non-use and evaporation, for example, will not affect the operation of the skimmer. The threaded connection of the flange 43 into the pipe 42 permits adjustment to accommodate any vertical forces in the piping, especially in the flexible pipe 41.

The float 44 and upper portion of the pipe are confined by a cylindrical perforated or meshed guide 47 that is fixed with respect to the tank 25. The pipe 42 extends through the bottom wall of this guide, and the flange and float assembly are too large to be retracted through this wall.

Figure 1:
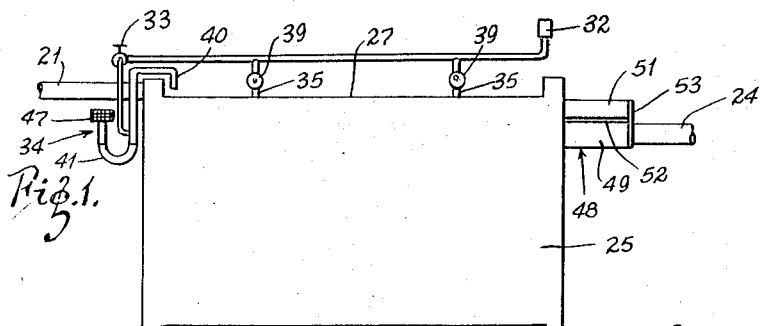
FIG. 1 is a side view of the inner tank with a skimmer and an overflow weir.
Figure 2:
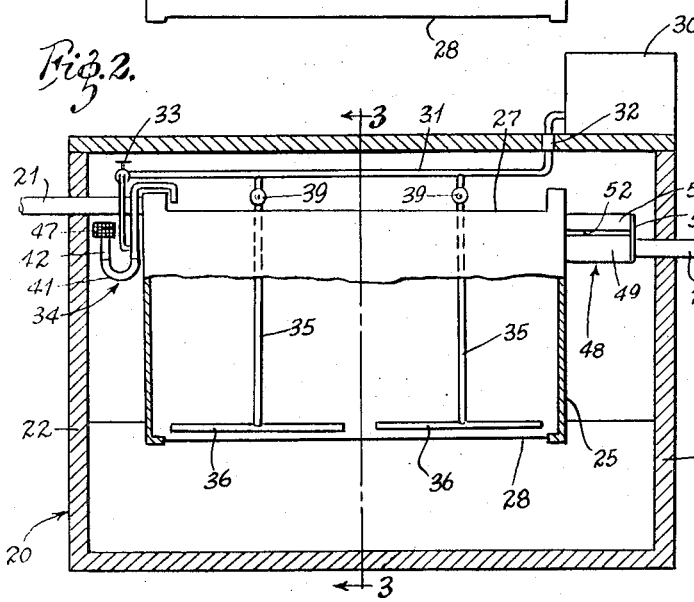
FIG. 2 is a longitudinal medial section of the unit of FIG. 1 installed in an outer septic tank.
Figure 5:
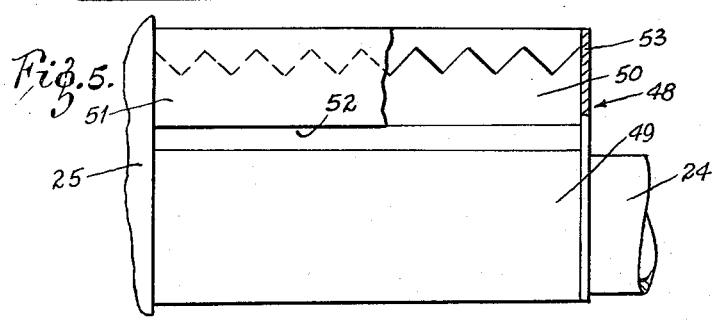
FIG. 5 is a side elevation of an end-type overflow weir, the view being partly broken away.
Figure 6:
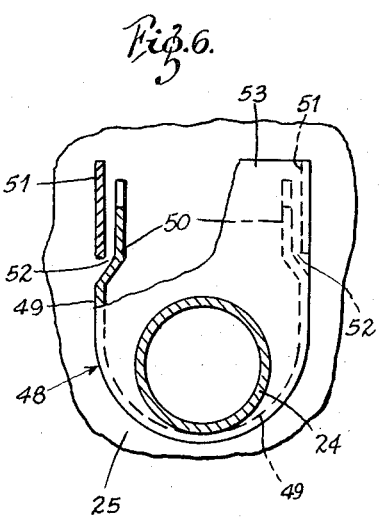
FIG. 6 is an end view of the overflow weir of FIG. 5, parts being broken away.

The discharge will take place through an overflow weir operation with or without the presence of a chlorinator. A form of weir is illustrated in FIGS. 2, 5 and 6. FIG. 2 shows the overflow weir 48 attached to the outside of the end wall of the inner tank 25. It has an outer shell 49 of U-shaped cross section, the upper edges of the overflow weir being inset as shown at 50 in FIG. 6, and each being V-notched along its top edge as shown. Outside the V-notched edges and attached to the upstanding portions 50 of the wall (by means not shown) are scum baffles 51. These extend upwardly to above the V-notches, thereby extending above the water line as will appear. They have also their lower edges upwardly spaced from the main panel to provide effluent slots 52. The unit is closed at its outer end by an end wall 53 that joins the ends of the shell 49 and the scum baffles 51.

In installations without a drain field it is desirable to have a chlorine tank employed with the unit. In this case it is preferable to use a so-called side overflow weir which extends along the cylindrical surfaces of the inner tank 25 instead of projecting out from the end wall thereof. This saves lengthwise space. This weir can be extended along the cylindrical surface of the inner tank 25 sufficiently to take care of the volume of flow expected.

As shown particularly in FIGS. 7 and 8, the side overflow weir incorporates opposite side walls 56, notched along their upper edges as shown in FIG. 7, and joined to the cylindrical wall of the tank 25 at their bottom edges. At their inner ends, they are joined by end sections 57 to the tank 25.

Outward of the end of the tank 25, the panels 56 are spanned by an end wall 58, and the entire trough-like receptacle is closed by a bottom wall 59 that is attached to the bottom edges of the side walls 56 and the end wall 58. Outside the notched side panels 56 and spaced a small distance therefrom are scum baffles 60. These are supported on the end wall 58, and provide narrow slots 61 through which the liquid may rise against the notched walls 56. This restricts scum from reaching the notched edges of the walls 56.

The bottom wall 59 has a discharge pipe or conduit 64 depending therefrom and opening into a chlorine tank 65. This chlorine tank 65 is attached to the end wall of the tank 25 by appropriate means, not shown. The chlorine tank 65 is designed to hold effluent for a period of time, during which it can be treated with chlorine. The discharge pipe 64 from the overflow weir leads into one side of the chlorine tank 65 adjacent a baffle 67. Further baffles 68, 69 and 70 alternately extending from the bottom and top walls in the manner illustrated provide a tortuous path from the inlet 64 of the chlorine tank 65 to an outlet pipe 71.

Operation

It will be assumed first that the outer tank 20 may be already in place and that the present unit is a conversion unit therefor. In some cases, the entire conversion unit and outer tank will have to be supplied.

The conversion tank 25 is inserted into the main tank 20 with appropriate supports, not shown, and is stabilized in position with space all around it so that there can be a free circulation of liquid in the manner to be described. The compressed air system is connected to the suitably located compressor 30. The compressor is electrically connected to operate either continuously or at timed intervals as is known in the art.

One of the air lines is led into the skimmer 34 so that it can activate the skimmer when air is being pumped. Since the skimmer inlet is supported by the float 44, it is maintained in constant relationship to the liquid surface, so that it can function regardless of liquid level changes due, for example, to no incoming sewage or to evaporation.

The influent pipe 21 from the building is connected to discharge into the upper part of the inner tank 25. The system will fill to the notched overflow weir walls 48, or if used, to the notched weir walls 56. The final effluent pipe 24 or 71 is connected to a drain field or other appropriate place. If the chlorinator is used, it will be supplied at appropriate intervals with chlorination material, such as tablets.

Sewage is delivered to the system by the influent pipe 21 at irregular intervals and in irregular quantities. The tank 25 normally stays filled to the notched weirs, as inflow of raw sewage through the influent pipe 21 causes outflow of liquid effluent over the weirs into the effluent pipe in quantity equal to the amount of said inflow. The sewage is expected to have a dwell within the system of approximately 24 hours, this being a matter of fixing the capacity of the system with respect to the quantity of sewage meant to be disposed of from the building, per day.

Within the inner tank 25 air is delivered continuously or periodically through the diffusers 36 and 36 and rises in bubbles through the liquid. The top of the system should be vented to prevent excess pressure within it. The cover of the outer tank 20 may be a grating so as not to require a specific venting. This air provides a mixing action and keeps solids in suspension within the inner tank 25 by producing flow upward along a diametrical plane in the tank 25 across the top and back down the sides. It also provides for aerobic decomposition of the sewage, both by the action of the diffused air from the bottom of the tank 25 and from the agitation at the surface caused by escaping bubbles of air. For this last reason, a larger upper surface exposed to air is desirable. The interior of the tank 25 is called the aeration zone.

As sewage is added to the inner tank 25, the hydrostatic head balancing effect between the inside and outside of the tank 25 causes discharge from the aeration zone within the tank through the bottom slot 28 into the outer tank 20, outside the tank 25. This area includes a clarifier zone which is the upper area outside the tank 25, and a sludge zone which is the lower area of the outer tank 20, below the tank 25. This preferably has the sloping walls shown.

In the clarifier zone, the bacterial action continues and also settleable solids, which have passed through the slot 28, settle out from the clarifier zone back into the sludge zone. However, the air diffusers are positioned at the bottom of the tank 25, just above the slot 28, producing an entrainment effect, drawing solids that settle from the clarifier zone back into the inner tank 25 where they, becoming mixed again with the incoming sewage, can undergo further aerobic treatment. In this way, additional biological action on these solids is obtained, and they may be more completely converted. Also the liquid in the clarifier zone is more positively purified of solids.

Floating solids in the clarifier zone are prevented from entering the effluent by the scum baffles 51 or 60 on the overflow weir. The passages 52 and 61 are relatively small so that only what is essentially liquid can pass through them. Ultimately any scum in the clarifier zone is collected by the skimmer and returned into the aeration zone within the tank 25.

Clear effluent passes under the scum baffles 51, through the passages 52, over the notched edges of the weir plate 50 into the discharge 24. The notched weirs have the advantage over a single weir in that an increase in liquid inflow into the system will be accommodated rapidly by a large overflow of effluent over the weirs without great change in liquid level. Overflow resulting from a surge of influent is avoided, blocking by solids is minimized, and discharge of solids from the system is reduced, by the multiple notched weirs. The effluent from the weirs can go then directly to an existing drain field or where used, it can go into the chlorine tank.

When the chlorine tank is used, with what is called the side overflow weir, the liquid rises through the passages 61 and over the notched weir panels 56. From the bottom wall 59 the liquid effluent flows through the pipe 64 into one end of the chlorinator tank 65, the walls of which extend above the liquid level of the system. The baffles assure that there will be adequate dwell within this tank. After suitable treatment therein, it flows out the ultimate discharge line 71 to the drain field or surface disposal.

The equipment is easily cleanable, since the outer tank 20 can be cleaned by removing the cover or grating and drawing the sludge out either around the ends of the inner tank or through the two slots 27 and 28. The large slot 27 at the top of the inner tank 25 gives full access to the interior thereof for both cleaning and for servicing the water system. As noted, appropriate valves are provided for each branch of the compressed air system and can be adjusted to provide the proper velocity through each part of this equipment.

As early noted, one of the advantages of the present system is that it can be applied as a conversion unit to an existing tank. All that is necessary is to provide an inner tank that is suitable to the size and shape of the existing outer septic tank 20, the inner tank to have the appropriate slots to receive the air piping and skimmer, together with the overflow weirs, perhaps with the chlorinator. Where length is at a premium due to larger capacity units, the side overflow type of weir operation is preferred.

While prior art units have had inner tanks, sometimes with means to cause circulation therein, the present system has the advantage that the inner tank is open top and bottom so that pressures can equalize and surface aeration can occur. It provides for the intake of sewage from the clarifier zone by air, thus combining a mechanical movement of the sewage with an aeration effect thereon. This effect is enhanced by having the air discharged at the bottom of the aeration zone just above the slot 28.

Various changes and modifications may be made within this invention as will be readily apparent to those skilled in the art. Such changes and modifications are within the scope and teaching of this invention as defined by the claims appended hereto.

What is claimed is:

1. In a sewage treatment system for use with an outer septic tank: an inner tank of a size to be installed within the septic tank above the bottom thereof and contained therein, the inner tank being of a size with respect to the outer tank to provide space outside and above the inner tank; the inner tank having an opening in the top, an influent conduit connected into the inner tank to admit sewage, and an effluent conduit to discharge from the area outside the inner tank, the latter being at a level below the top opening of the inner tank to provide a liquid level within the system which is below the top opening of the inner tank but above the bottom opening to permit the inner tank to surround interior liquid and be surrounded by other exterior liquid; the inner tank having a long narrow slot opening above the bottom of the septic tank that establishes communication between the interior and exterior liquid masses; and air means discharging air adjacent the bottom slot opening in the inner tank to rise within the inner tank to aerate the interior liquid contents thereof, the air means comprising fixed means generally coextensive with the elongated narrow slot in the inner tank, and located to cause upward circulation of liquid material in the inner tank and flow from the exterior liquid below the inner tank through the slot into the interior liquid in that tank, to be circulated therewith, the air means being separated from the slot sufficiently to permit liquid flow from the inner tank to the outer tank when sewage is introduced into the inner tank by the influent conduit.

2. The system of claim 1 wherein there is an overflow weir means attached to the outside of the inner tank, including a receptacle to receive liquid from the tank, and an effluent pipe means leading from the receptacle.

3. In the system of claim 2, wherein the overflow weir means has an overflow wall, and a scum baffle alongside the wall, having its lower edge providing a narrow slot admitting only material of substantially liquid state to the weir wall, and its upper edge extending above the liquid level.

4. In the system of claim 2, the weir means having weir walls extending over the upper part of the inner tank and beyond the end thereof, with associated wall means to constitute a receptacle over and beyond the end of the inner tank.

5. The system of claim 1 wherein there is a skimmer located opposite the discharge from the system, including a skimmer inlet in the septic tank and a skimmer outlet discharging into the inner tank, and liquid-level responsive means to maintain the skimmer inlet in a substantially constant relation to the liquid level.

6. In the system of claim 5, means to maintain the skimmer inlet adjacent the liquid surface comprising a float and piping attached to the float and extending across to discharge into the inner tank.

7. In the system of claim 1, the inner tank being an elongated cylinder having its longitudinal axis disposed horizontally in the outer tank, and the bottom and top openings being in the form of slots extending substantially from end to end thereof, and the air means comprising perforated diffusers extending parallel to the axis of the tank just above the bottom slot opening.

8. In the system of claim 1, a chlorinator mounted on the end of the inner tank adjacent the effluent conduit.

9. The system of claim 1 wherein the inner tank has its lower walls converging downwardly toward the side edges of the slot, so that fluid circulation can be medially upward, then outward and downward, and finally inward toward the slot.

* * * * *